Aug. 30, 1927.
J. M. HOWE
1,640,356
BEARING MECHANISM
Filed Sept. 6, 1924
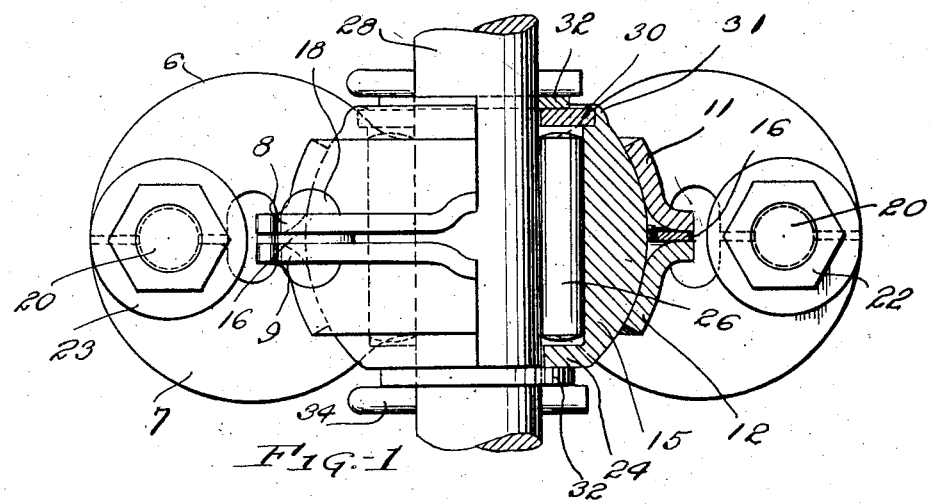
Fig. 1
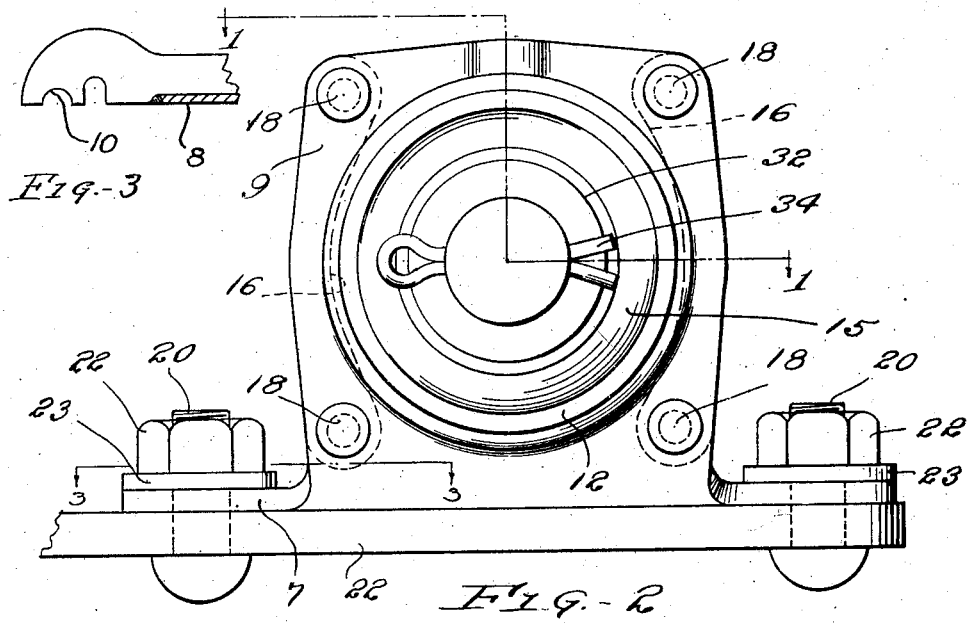
Fig. 3
Fig. 2
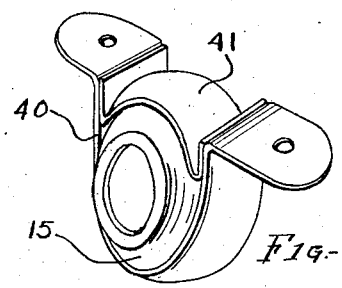
Fig. 4
INVENTOR.
James M. Howe
BY Bates, Macklin, Goldrick & Teare
ATTORNEYS Patented Aug. 30, 1927.

1,640,356

UNITED STATES PATENT OFFICE.

JAMES M. HOWE, OF CLEVELAND HEIGHTS, OHIO, ASSIGNOR TO THE MURRAY MANUFACTURING COMPANY, OF CLEVELAND, OHIO, A CORPORATION OF MICHIGAN.

BEARING MECHANISM.

Application filed September 6, 1924. Serial No. 736,225.

This invention is concerned with bearings and more particularly to bearings adapted to support a rotatable member such as a shaft or axle and has for its general object the provision of a novel self-aligning bearing mechanism.

A further object of my invention is the provision of an economical bearing construction adaptable for use in supporting the drive shaft of a toy vehicle provided with a spring suspension for the body of the vehicle.

Other objects of my invention will hereinafter be set forth in the following description referring to the accompanying drawings illustrating a form thereof. The essential characteristics are summarized in the claims.

Fig. 1 is a plan view of my bearing construction with a portion thereof shown in cross-section; and corresponding to the line 1—1 shown of Fig. 2 which is a side elevation of the same; Fig. 3 is a fragmentary view of a portion of the bracket comprising a part of the bearing mechanism; Fig. 4 shows a modified form of my invention.

The bearing illustrated in the drawing is shown as being adapted to be attached directly to the spring of a vehicle whereby it may support the rear axle thereof and embodies a roller journal or cage having a spheroidal surface engaging complementary surfaces formed on the bracket of the bearing.

The bearing bracket may comprise stamped metal members 6 and 7 having upright portions 8 and 9. The upright portions of the bearing bracket have formed thereon socket portions 11 and 12, the inner surfaces of which are spheroidal and constitute a bearing for the journal 15. Spaced members 16 may be provided through which any bracket joining means, preferably in the form of rivets 18, may extend. When the metal members 6 and 7 are in assembled relation, the base portions thereof constitute pedestals for the bearing proper. The base portions are provided with semi-circular notches 18, which, when the two bracket members are in assembled relation form an opening through which securing bolts 20 may pass.

As shown in the drawings, these bracket members may be secured to a spring member 22 by the bolt members 20 and nut members 22 engaging the threaded ends of the bolts. Washer members 33 being provided to span the spaces between the pedestal portions of the bracket members.

The journal 15 may be formed, as shown, with an end wall 24 to retain rollers 26 disposed within the journal and which bear directly upon a rotatable member, such as a shaft 28. The opposite end of the journal may be closed by a disc member 30 fitting in a suitable counter bore in the end of the journal member and may be retained in place by a turned-in or spun portion 31 of the journal member.

In Fig. 4, I show a modified form of bracket construction comprising a bracket member 40 stamped to receive the journal member 15 and a bottom retaining member 41 similarly stamped and spot welded or otherwise suitably secured to the bracket member 40 to form a socket for the journal 15 substantially as hereinbefore described.

Thrust members in the form of washers may be disposed at each end of the journal member and may be maintained in position to receive the thrust from the journal member by pins 34 extending through suitable openings in the shaft member 28.

The bearing construction herein described may be readily manufactured on a production basis in a very economical manner. It will be seen that it is particularly adaptable for use in supporting a shaft subject to a swinging movement such as the shaft of a toy vehicle having a spring mounted body. In the latter case the bearing may be secured directly to the spring, the self-aligning feature of the bearing permitting a deflection of one spring while the other spring remains in a normal position without interfering in any way with the fulfillment of the anti-friction characteristics of the roller bearing.

I claim:

1. A bearing of the character described, comprising a pair of bracket members complementarily formed to provide bracket portions and having sockets formed therein, the sockets having complementary spheroidal surfaces, the journal member having a spheroidal surface engaging the complementary surfaces of the bracket members, a rotatable member to be borne, roller members encased by the journal member and bearing directly on the rotatable member, means maintaining the bracket members with the sockets thereof in engagement with the spheroidal surface of the journal member, said journal member having a roller receiving bore thereof closed at one end to retain the roller members and a disc closing the other end of the bore and retained in place by a portion of the journal member overlying the disc.

2. A bearing of the character described, comprising a pair of complementary bracket members having sockets formed therein, the sockets having complementary spheroidal surfaces, the journal member having a spheroidal surface engaging the complementary surfaces of the bracket members, a shaft, roller members encased by the journal member and bearing directly on the shaft, means maintaining the bracket members with the socket thereof in engagement with the spheroidal surface of the journal member, said journal member having both ends closed to retain the roller member, and thrust members engaging the ends of the journal member, said thrust members being supported by the shaft.

3. A self-aligning roller bearing mechanism having in combination a rotatabe member, a plurality of roller members, a journal therefor, comprising a casing provided with a spheroidal surface, a pair of pressed metal bracket members complementarily formed exteriorly and interiorly and having socket portions provided with spheroidal surfaces adapted to engage the spheroidal surface of the journal member, means securing the bracket members together, said means extending through the bracket members adjacent the socket portions thereof, and flanges extending laterally in opposite directions from both said bracket members for attachment to a base.

4. A bearing for a shaft comprising a spheroidal member embracing the shaft and formed to retain rollers in contact with the shaft, a pair of bracket members separated along a line normal to the axis of the shaft, and secured together along the line of separation, said bracket members having spheroidal surfaces complementary to the spheroidal surface of said first named member, each of the bracket members having a flange, the two flanges lying in the same plane, and recesses in said flanges along their adjacent edges for receiving an attaching member, whereby the bracket member may be secured to a base.

5. A bearing for a shaft comprising a spheroidal member, rolling elements contained thereby, and arranged to support such shaft, two bracket members each having interior spheroidal surface complementary to the spheroidal surfaces of the first named member, and having flange portions extending outwardly in substantially a common plane, and means to hold said bracket members together, whereby the flanges of the two bracket members constitute in effect a single rigid flange structure, whereby the bearing may be secured to a base.

6. A shaft bearing comprising the combination, a spheriodal member formed to retain rollers on its interior in contact with the shaft, and a pair of members separated along a plane normal to the axis of the shaft and having spheriodal inner surfaces in contact with the surfaces of the spheroidal member, mutually overlying flanges formed on the bracket members and registering openings in the flanges at separated points, segmental shim members disposed between the flanges and extending from one pair of registering openings to another, and clamping means extending through the registering openings and the shims.

In testimony whereof, I hereunto affix my signature.

JAMES M. HOWE.